(12) United States Patent
Sishtla

(10) Patent No.: US 6,216,474 B1
(45) Date of Patent: Apr. 17, 2001

(54) PART LOAD PERFORMANCE OF VARIABLE SPEED SCREW COMPRESSOR

(75) Inventor: Vishnu M. Sishtla, Cicero, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/405,120

(22) Filed: Sep. 27, 1999

(51) Int. Cl.[7] .................................................. F25B 43/02

(52) U.S. Cl. ..................................... 62/84; 62/193; 62/469

(58) Field of Search ............................... 62/84, 193, 468, 62/469

(56) References Cited

U.S. PATENT DOCUMENTS

| 4,503,685 | * | 3/1985 | DiCarlo et al. | 62/193 |
| 4,662,190 | * | 5/1987 | Tischer | 62/84 |
| 5,603,227 | * | 2/1997 | Holden et al. | 62/193 |
| 5,634,345 | * | 6/1997 | Alsenz | 62/193 |
| 5,761,914 | * | 6/1998 | Carey et al. | 62/84 |
| 5,970,722 | * | 10/1999 | Shibata et al. | 62/84 |
| 6,010,315 | * | 1/2000 | Kishimoto et al. | 62/193 |

* cited by examiner

Primary Examiner—William E. Tapolcai

(57) ABSTRACT

Lubrication supply to the rotors of a variable speed screw compressor is optimized for full load and a supplemental supply path is provided which is opened during low speed operation.

4 Claims, 2 Drawing Sheets

PART LOAD PERFORMANCE OF VARIABLE SPEED SCREW COMPRESSOR

BACKGROUND OF THE INVENTION

Screw compressors used in water cooled chillers are of the oil flooded type. Oil provides a seal between adjacent trapped volumes during the compression process and an oil separator removes oil from the hot, compressed gas downstream of the compression process. At high speeds, the percentage of gas leakage between the rotor and housing and interlobes is small as compared to the inlet flow. This is partly due to the oil film formed between the rotor and housing. Additionally, to reduce drag loses, the amount of oil injected should be kept at a minimum. For screw compressors the loading or flow is directly proportional to speed. At low speeds the sealing at the tips and interlobes is poor which reduces the volumetric efficiency of the compressor.

SUMMARY OF THE INVENTION

Volumetric efficiency is increased at low speeds by increasing the oil flow at low loads to offset the poorer sealing at low speeds. Oil from the cooler or evaporator is injected at the rotor inlet for sealing. An oil-rich layer tends to form at the top of the cooler and an ejector is used to draw oil from the top surface of the cooler. The drive or motive fluid for the ejector is, preferably, taken from the last closed lobe, although the discharge pressure may be used. The last closed lobe pressure is preferred because it is determined by compressor operation whereas discharge pressure is determined by system conditions. The amount of oil injected is optimized for full load operation by proper selection of ejector size. Because, at low loads the oil supply should be increased for better volumetric efficiency, a supplemental oil supply is provided. One approach is to provide a parallel supply path from the ejector which is controlled by a solenoid valve responsive to motor speed. Another approach is to provide a second ejector and supply path to the rotors with a solenoid valve in the second path responsive to motor speed.

It is an object of this invention to improve part load performance of variable speed screw compressors.

It is another object of this invention to increase volumetric efficiency at low speeds by increasing oil flow to the rotors at low speeds. These objects, and others as will become apparent hereinafter, are accomplished by the present invention.

Basically, lubrication supply to the rotors of a variable speed screw compressor is optimized for full load and a supplemental supply path is provided which is opened during low speed operation.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
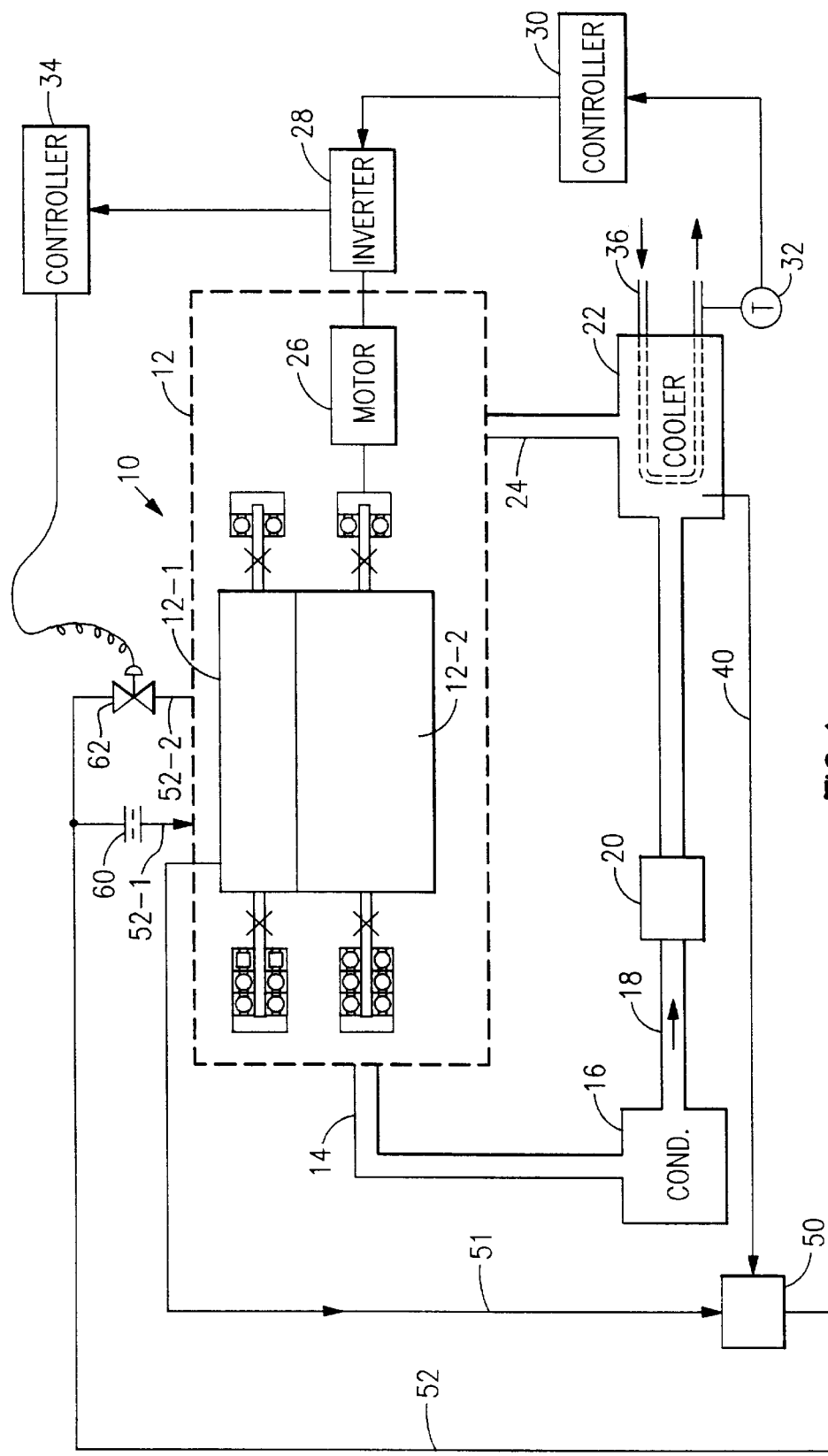
FIG. 1 is a schematic diagram of a closed refrigeration or air conditioning system employing the present invention.

In FIG. 1, the numeral 10 generally designates a closed refrigeration or air conditioning system. As is conventional, there is a closed circuit serially including compressor 12, discharge line 14 connected to the discharge port, condenser 16, line 18 which contains expansion device 20, cooler or evaporator 22 and suction line 24 leading to the suction port. Compressor 12 is a multi-rotor, hermetic, screw compressor. Compressor 12 is driven by electric motor 26 which is under the control of inverter 28 through microprocessor or controller 30.

An oil-rich layer forms an upper layer in cooler 22 and is used for lubricating and sealing the rotors 12-2 and 12-2. The lubricant is drawn from cooler 22 and supplied via line 40 to ejector 50 which is sized to supply the maximum required amount of lubricant. Line 52 supplies refrigerant gas at last closed lobe pressure to ejector 50 causing the oil in a refrigerant oil mixture to be drawn from cooler 22 via line 40 and to be supplied to compressor 12 for lubricating and sealing the rotors 12-1 and 12-2. Line 52 branches downstream of ejector 50 into lines 52-1 and 52-2. Line 52-1 contains a restriction 60 sized to provide the proper lubricant flow to the rotors 12-1 and 12-2 during full load conditions. Line 52-2 contains a normally closed solenoid valve 62 and is under the control of controller or microprocessor 34 responsive to the speed of motor 26 via the output of inverter 28. Microprocessor 30 receives temperature inputs from thermal sensor 32 which senses the outlet chilled water temperature and responsive thereto controls inverter 28, and thereby compressor 12. When the motor speed has been reduced sufficiently, solenoid valve 62 is opened by controller 34 to permit more oil to be supplied to the rotors 12-1 and 12-2 for sealing and lubrication. Typically, the motor sped would be 50–60% of the full load speed when solenoid valve 62 is opened.

Figure 2:
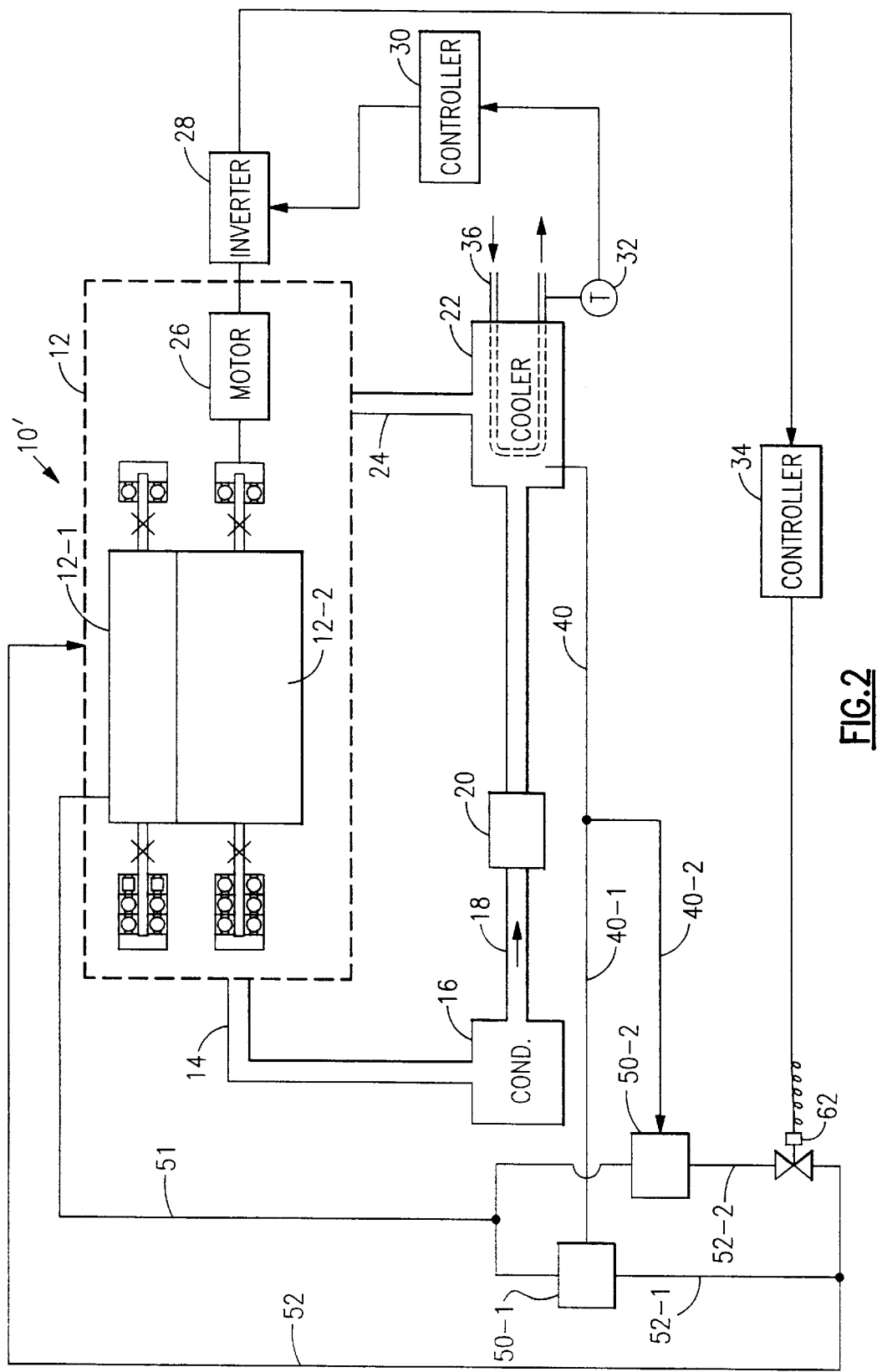
FIG. 2 is a schematic diagram of a closed refrigeration or air conditioning system employing a modified embodiment of the present invention.

Referring now to FIG. 2, system 10' differs from system 10 in dividing line 40 and replacing ejector 50 with two smaller ejectors, 50-1 and 50-2, in parallel. Specifically, line 40 divides into lines 40-1 and 40-2 which are connected to ejectors 50-1 and 50-2, respectively. Line 52 divides into lines 52-1 and 52-2 which recombine into line 52 after supplying refrigerant gas at last closed lobe pressure to ejectors 50-1 and 50-2, respectively. Ejector 50-1 is sized such that the oil refrigerant mixture drawn from cooler 22 via line 40-1 is the proper amount to provide sealing and lubrication of rotors 12-1 and 12-2 at full load Line 52-2 contains normally closed solenoid valve 62 in addition to ejector 50-2. When the speed of motor 26 has been sufficiently reduced by inverter 28 under control of controller 30, solenoid valve 62 is opened by controller 34 to permit more oil to be supplied to the rotors 12-1 and 12-2 for sealing and lubrication. Typically, the motor speed would be 50–60% of the full load speed when solenoid valve 62 is opened.

Although preferred embodiments of the present invention have been illustrated and described, other changes will occur to those skilled in the art. It is therefore intended that the scope of the present invention is to be limited only by the scope of the appended claims.

What is claimed is:

1. A closed refrigeration system containing refrigerant and oil and serially including a variable speed screw compressor having a plurality of rotors, a suction port and a discharge port and driven by a motor, a discharge line extending from said discharge port to a condenser, an expansion device, a cooler and a suction line connected to said suction port, the improvement comprising:

means for pumping;

a lubrication distribution system connected to said means for pumping;

means for supplying an oil rich mixture from said cooler to said means for pumping;

means for causing said means for pumping to supply said oil rich mixture at a first rate to said lubrication distribution system for sealing and lubricating said rotors when said compressor is operating at full load and at a second, greater rate when said compressor is operating at part load.

2. The closed refrigeration system of claim 1 wherein said means for pumping is an ejector pump and said means for causing supplies high pressure refrigerant to said ejector pump at last closed lobe pressure.

3. The closed refrigeration system of claim 2 further including:

a second ejector pump;

means for supplying high pressure refrigerant to said second ejector pump;

said second ejector pump being operatively connected to said cooler;

means connected to said second ejector pump for supplying a refrigerant-oil mixture drawn from said cooler to said rotors for lubrication and sealing when high pressure refrigerant is supplied to said second ejector pump.

4. In a closed refrigeration system containing refrigerant and oil and serially including a variable speed screw compressor having a plurality of rotors, a suction port and a discharge port and driven by a motor, a discharge line extending from said discharge port to a condenser, an expansion device, a cooler and a suction line connected to said suction port, the improvement comprising the method of improving part load performance comprising the steps of:

supplying lubricant from the cooler to the rotors at a first rate for lubrication and sealing when said compressor is fully loaded;

supplying lubricant from the cooler to the rotors at a second rate, greater then said first rate, for lubrication and sealing when said compressor is less than 60% loaded.

\* \* \* \* \*